United States Patent [19]

Hirayama et al.

[11] Patent Number: 5,415,927
[45] Date of Patent: May 16, 1995

[54] WATER-REPELLANT GLASS PRODUCTS AND PROCESS FOR THE PRODUCTION THEREOF

[75] Inventors: Naoto Hirayama; Hirotsugu Nagayama; Akio Takigawa; Kiyotaka Sasaki, all of Osaka; Misao Tsutsuki, Toyota; Yasuhiro Otsuka, Aichi, all of Japan

[73] Assignees: Nippon Sheet Glass Co., Ltd.; Toyota Jidosha Kabushiki Kaisha, both of Japan

[21] Appl. No.: 952,411

[22] Filed: Sep. 30, 1992

[30] Foreign Application Priority Data

Oct. 4, 1991 [JP] Japan .................................. 3-256824

[51] Int. Cl.$^6$ ...................... B32B 17/06; C03C 14/00
[52] U.S. Cl. ................ 428/307.3; 428/322.7; 428/331; 428/336; 428/410; 428/421; 428/428; 428/429; 428/447
[58] Field of Search .................. 428/307.3, 322.7, 331, 428/336, 410, 421, 428, 429, 447

[56] References Cited

FOREIGN PATENT DOCUMENTS 61-281047 12/1986 Japan .
62-191447 8/1987 Japan .

*Primary Examiner*—D. S. Nakarani
*Attorney, Agent, or Firm*—Lorusso & Loud

[57] ABSTRACT

An inorganic or organic glass product, or tempered glass product excellent in weatherability, water resistance, moisture resistance and abrasion resistance, which is formed of a) a silicate glass substrate, b) a porous modified layer enriched with silicon oxide through removal of components other than silicon oxide in a surface layer of the silicate glass substrate, and c) a water-repellent layer formed of at least one compound of an organic silicon compound and an organic fluorine compound on a surface of the porous modified layer.

7 Claims, No Drawings

WATER-REPELLANT GLASS PRODUCTS AND PROCESS FOR THE PRODUCTION THEREOF

FIELD OF THE INVENTION

The present invention relates to a water-repellent product obtained by providing a transparent or non-transparent product such as windshield glass for a building, an automobile, a vehicle, an aircraft or a ship, an optical component lens, or an inorganic or organic glass product with a water-repellent coating excellent in durability performances such as weatherability, moisture resistance, water resistance and abrasion resistance.

PRIOR ART

When a glass surface is provided with water repellency, a variety of effects can be expected. For example, (1) since waterdrops, which contain pollutants, hardly adhere to, or remain on, a glass surface, the contamination and yellowing of the glass surface can be prevented. (2) When this water-repellent glass is used as glass for a windshield or side window of an automobile, water on the glass is blown off due to a wind pressure while the automobile is running in the rain, and the driver's visual field is hence secured. Therefore, the safety in driving is improved. The above water-repellent glass is generally produced by a wet-coating method in which a water-repellent agent containing an organic silicon compound, typified by a polydimethylsiloxane compound or a fluorine-containing silicon compound, is wet-coated on a glass surface, or by a dry-coating method in which the above water-repellent agent is dry-coated by means of plasma or vapor deposition (Unexamined Patent Publication No. 62-191447: plasma method). However, in the above methods of coating the water-repellent agent directly on a glass surface, it is difficult to maintain water repellency for a long time, since the adhesion strength between the water-repellent agent and the glass is low.

In order to overcome the above problem, Japanese Unexamined Patent Publication No. 2-311332 discloses a method in which a glass surface is coated with a metal oxide layer by a sol-gel method and then the surface of the metal oxide layer is silylated with a silyl compound.

Although showing improvement in durability performances such as water resistance and moisture resistance, products obtained by the method disclosed in Japanese Unexamined Patent Publication No. 2-311332 do not have sufficient durability for outdoor use. Further, since heat treatment at about 400° C. or higher is required to form a metal oxide layer, the above method cannot be applied to tempered glass having a compressive-strain layer on the surface. Further, it requires a high cost to carry out the above method.

The present inventors have made a diligent study to overcome the above problems. As a result, the present inventors have found that the adhesion between a glass substrate and a water-repellent agent can be improved, and a glass product can be improved in durability performances such as weatherability, water resistance, moisture resistance and abrasion resistance, by modifying the surface of a glass substrate into a specific porous silica layer.

SUMMARY OF THE INVENTION

It is an object of the present invention to provide a glass product which is excellent in durability performances such as weatherability, water resistance, moisture resistance and abrasion resistance and which has a low reflectance and water repellency.

According to the present invention, there is provided a water-repellent glass product formed of a) a silicate glass substrate, b) a porous modified layer enriched with silicon oxide through removal of components other than silicon oxide in a surface layer of the silicate glass substrate, and c) a water-repellent layer formed of at least one of an organic silicon compound and an organic fluorine compound on a surface of the porous modified layer.

Further, according to the present invention, there is provided a process for producing a water-repellent glass product, which comprises the steps of a) immersing a silicate glass substrate in a silica-supersaturated aqueous solution of hydrosilicofluoric acid for a predetermined period of time to modify a surface layer of the silicate glass substrate to a porous layer, and b) coating a surface of the above-modified porous layer with at least one of an organic silicon compound and an organic fluorine compound.

DETAILED DESCRIPTION OF THE INVENTION

The present invention will be detailed hereinafter.

The glass substrate used in the present invention includes general alkali-containing glass such as soda-lime silicate glass, silicate glass such as soda-lime silicate glass provided with a compressive-strain layer on the surface by thermal or chemical tempering, and silicate glass containing a component such as an alkali metal or an alkaline earth metal other than silicon oxide. The glass substrate may have the form of any one of a plate, a curved plate, a box, a rod, and the like.

In the present invention, the surface layer of the silicate glass substrate is modified to a porous glass layer enriched with silicon oxide as follows. The silicate glass substrate is immersed in a silica-supersaturated aqueous solution containing 1 to 4 mol/l of hydrosilicofluoric acid at 25° to 50° C. for 30 minutes to 4 hours, whereby components in the substrate surface layer such as sodium and potassium other than silicon oxide are eluted into the aqueous solution, or removed from the surface layer. As a result, the porous glass layer is modified to a layer which is richer in silicon oxide than the initial silicate glass composition. The above silica-supersaturated aqueous solution of hydrosilicofluoric acid is prepared by dissolving a silica gel powder in an aqueous solution containing 1 to 4 mol/l of hydrosilicofluoric acid until the aqueous solution is saturated with the silica gel powder, and further adding boric acid such that the boric acid concentration is $1 \times 10^{-4}$ to $100 \times 10^{-4}$ mol/l.

The above-obtained porous layer has pores measuring tens to hundreds angstroms in diameter. The thickness of the porous layer increases with an increase in the time of contact between the substrate and the silica-supersaturated aqueous solution of hydrosilicofluoric acid, while the above thickness is properly 100 angstroms to 3,000 angstroms. When this thickness is less than 100 angstroms, there is no effect on promotion of adhesion between the glass substrate and the water-repellent agent. When this thickness exceeds 3,000 angstroms, the resultant glass product undesirably has low transparency Further, preferred is a porous layer having a smaller thickness in the above range. That is because an interference color is less conspicuous when the thickness is smaller in the above range, and because a crack in the porous layer, if any, is less conspicuous when the thickness is smaller. In a glass plate produced by a floating method in which the glass plate is formed by floating molten glass on a molten tin bath, the composition of its bottom surface (which has been brought into contact with the molten tin bath) and the composition of its top surface are different, and the rate of forming a porous silica-rich layer in the above floating method greatly differs between these two surfaces. It is therefore required to remove at least the bottom surface layer, preferably both the surface layers, before both the surfaces of the above-obtained glass are immersed in a silica-supersaturated aqueous solution of hydrosilicofluoric acid. Differing to some extent depending upon the glass plate production conditions, the thickness of the surface layer to be removed is generally 2 $\mu$m to 10 $\mu$m. The surface layer is removed by a chemical grinding (etching) method or a mechanical grinding method As a chemical grinding method, a method of immersing glass in a hydrofluoric acid aqueous solution is generally used. When the amount of etching by this method is too large, however, an uneven surface is formed The thickness of the surface layer to be removed is hence preferably not more than 50 $\mu$m.

In the present invention, a water-repellent layer of at least one of an organic silicon compound and an organic fluorine compound is formed on the above porous modified layer surface. The organic silicon compounds which may be used as a water-repellent agent include polysiloxane, a chlorosilane compound, an alkoxysilane compound, a silazane compound and agents composed mainly of these compounds. A water-repellent layer formed of the above silicon compound containing fluorine has remarkably low surface tension and shows excellent water repellency. These silicon compounds may be used in combination.

Suitable polysiloxanes include a linear, branched or cyclic polydimethylsiloxane; polysiloxanes having a hydroxyl group in the molecular chain such as silanol-terminated polydimethylsiloxane, silanol-terminated polydiphenylsiloxane, diphenylsilanol-terminated polydimethylphenylsiloxane, carbinol-terminated polydimethylsiloxane, hydroxypropyl-terminated polydimethylsiloxane and polydimethyl-hydroxyalkylene oxide methylsiloxane; polysiloxanes having an amino group in the molecular chain such as bis (aminopropyldimethyl)siloxane, aminopropyl-terminated polydimethylsiloxane, aminoalkyl group-containing, T-structured polydimethylsiloxane, dimethylamino-terminated polydimethylsiloxane and bis(aminopropyldimethyl)siloxane; polysiloxanes having a glycidoxyalkyl group in the molecular chain such as glycidoxypropyl-terminated polydimethylsiloxane, glycidoxypropyl-containing, T-structured polydimethylsiloxane, polyglycidoxypropylmethylsiloxane and a polyglycidoxypropylmethyldimethylsiloxane copolymer; polysiloxanes having a chlorine atom in the molecular chain such as chloromethyl-terminated polydimethylsiloxane, chloropropyl-terminated polydimethylsiloxane, polydimethyl-chloropropylmethylsiloxane, chloro-terminated polydimethylsiloxane and 1,3-bis (chloromethyl)tetramethyldisiloxane; polysiloxanes having a methacryloxyalkyl group in the molecular chain such as methacryloxypropyl-terminated polydimethylsiloxane, methacryloxypropyl-containing, T-structured polydimethylsiloxane and polydimethyl-methacryloxypropylmethylsiloxane; polysiloxanes having a mercaptoalkyl group in the molecular chain such as mercaptopropyl-terminated polydimethylsiloxane, polymercaptopropylmethylsiloxane and mercaptopropyl-containing, T-structured polydimethylsiloxane; polysiloxanes having an alkoxy group in the molecular chain such as ethoxy-terminated polydimethylsiloxane, polydimethylsiloxane having trimethoxysilyl on one terminal and a polydimethyloctyloxymethylsiloxane copolymer; polysiloxanes having a carboxyalkyl group in the molecular chain such as carboxylpropyl-terminated polydimethylsiloxane, carboxylpropyl-containing, T-structured polydimethylsiloxane and carboxylpropyl-terminated, T-structured polydimethylsiloxane; polysiloxanes having a vinyl group in the molecular chain such as vinyl-terminated polydimethylsiloxane, tetramethyldivinyldisiloxane, methylphenylvinyl-terminated polydimethylsiloxane, a vinyl-terminated polydimethyl-polyphenylsiloxane copolymer, a vinyl-terminated polydimethyl-polydiphenylsiloxane copolymer, a polydimethyl-polymethylvinylsiloxane copolymer, methyldivinyl-terminated polydimethylsiloxane, a vinyl terminated polydimethylmethylvinylsiloxane copolymer, vinyl-containing, T-structured polydimethylsiloxane, vinyl-terminated polymethylphenetylsiloxane and cyclic vinylmethylsiloxane; polysiloxanes having a phenyl group in the molecular chain such as a polydimethyl-diphenylsiloxane copolymer, a polydimethyl-phenylmethylsiloxane copolymer, polymethylphenylsiloxane, a polymethylphenyl-diphenylsiloxane copolymer, a polydimethylsiloxane-trimethylsiloxane copolymer, a polydimethyl-tetrachlorophenylsiloxane copolymer and tetraphenyldimethylsiloxane; polysiloxanes having a cyanoalkyl group in the molecular chain such as polybis(cyanopropyl)siloxane, polycyanopropylmethylsiloxane, a polycyanopropyl-dimethylsiloxane copolymer and a polycyanopropylmethyl-methyphenylsiloxane copolymer; polysiloxanes having a long-chain alkyl group in the molecular chain such as polymethylethylsiloxane, polymethyloctylsiloxane, polymethyloctadecylsiloxane, a polymethyldecyl-diphenylsiloxane copolymer and a polymethylphenetylsiloxane-methylhexylsiloxane copolymer; polysiloxanes having a fluoroalkyl group in the molecular chain such as polymethyl-3,3,3-trifluoropropylsiloxane and polymethyl-1,1,2,2-tetrahydrofluorooctylsiloxane; polysiloxanes having a hydrogen atom in the molecular chain such as hydrogen-terminated polydimethylsiloxane, polymethylhydrosiloxane and tetramethyldisiloxane; hexamethyldisiloxane; and a polydimethylsiloxane-alkylene oxide copolymer. Many polysiloxanes are commercially available as water repellents, such as Super Rain X formed mainly of polydimethylsiloxane (supplied by Unelko) and Glass Clad 6C formed mainly of polydimethylsiloxane whose terminal groups are replaced with chlorine atom (supplied by Petrarch Systems Inc.). For adhesion to a porous silica layer, it is advantageous to use polysiloxanes having functional groups which easily physically or chemically bond to a hydroxyl group on the silica surface, such as alkoxy, hydroxyl and amino groups. The above polysiloxanes may be used alone or in combination.

The chlorosilane compound and the alkoxysilane compound have the following formula (1), $$R^1{}_m\text{—Si—}R^2{}_n \qquad (1)$$

wherein $R^1$ is an alkyl group having 1 to 20 carbon atoms, a fluoroalkyl group or an alkyl or a group containing fluoroalkyl in combination with a —O—, $CO_2$—, $SO_2N$ ($C_3H_7$) or —CONH—, $R^2$ is chlorine or an alkoxy group having 1 to 6 carbon atoms, m is 1, 2 or 3, and n is 1, 2 or 3, provided that m+n=4. Typical examples of the chlorosilane compound and alkoxysilane compound include $C_{18}H_{37}SiCl_3$, $C_{18}H_{37}Si(OCH_3)_3$, $C_{12}H_{25}SiCl_3$, $C_{12}H_{25}Si(OCH_3)_3$, $CF_3(CF_2)_7CH_2CH_2Si(OCH_3)_3$, $CF_3(CF_2)_7CH_2CH_2SiCl_3$, $CF_3(CF_2)_5CH_2CH_2SiCl_3$, $CF_3(CF_2)_5CH_2CH_2Si(OCH_3)_3$, $CF_3CH_2CH_2SiCl_3$, $CF_3CH_2CH_2Si(OCH_3)_3$, $C_8F_{17}SO_2N(C_3H_7)CH_2CH_2CH_2Si(OCH_3)_3$, $C_7F_{15}CONHCH_2CH_2CH_2Si(OCH_3)_3$, $C_{88}F_{17}CO_2CH_2CH_2CH_2Si(OCH_3)_3$, $C_8F_{17}$—O—CF($CF_3$)$CF_2$—O—$C_3H_6SiCl_3$ and $C_3F_7$—O—$(CF(CF_3)CF_2$—O$)_2$—$CF(CF_3)CONH$—$(CH_2)_3Si(OCH_3)_3$. These compounds may be used as a mixture, or may be preliminarily converted to partial hydrolysis condensates with an acid or an alkali before use.

Typical examples of the silazane compound include hexamethyldisilazane and $CF_3(CF_2)_7CH_2CH_2Si(NH)_{3/2}$. These may be used as a mixture, or may be preliminarily converted to partial hydrolysis condensates with an acid or an alkali before use.

The organic fluorine compound used in the present invention are largely classified into compounds having a low molecular weight or a polymer or oligomer compound. Suitable compounds having low molecular weight include fluoroalkyl alcohols, fluoroalkylcarboxylic acids and fluoroalkylamines in addition to the above organic fluorine-containing silicon compounds. Suitable polymers and oligomers include polytetrafluoroethylene, polytrifluoroethylene, polyvinyl fluoride, polyvinylidene fluoride, polyperfluoroalkyl vinyl ether, polyperfluoropropylene, a polytetrafluoroethylene-perfluoropropylene copolymer, a polytetrafluoroethylene-ethylene copolymer and a polyvinyl fluoride-ethylene copolymer. Further, the suitable polymers and olgomers compound also include compounds prepared by introducing a functional group such as hydroxyl, amino, epoxy or carboxyl into any one of the above organic fluorine compounds, and fluorine polyethers or fluorine-containing poly(meth)acrylates. Typical examples of the polyethers include perfluoroethylene oxide, perfluoropropylene oxide, a perfluoromethylene oxide-perfluoropropylene oxide copolymer, a perfluoromethylene oxide-perfluoroethylene oxide copolymer, a perfluoroethylene oxide-perfluoropropylene oxide copolymer and a compound prepared by introducing carboxyl, hydroxylalkyl, ester or isocyanate into the terminus or molecular chain of any one of the above fluorine-containing polyethers. Typical examples of the (meth)acrylates include polytrifluoroethyl (meth)acrylate, polytetrafluoropropyl (meth)acrylate, polyoctafluoropentyl (meth)acrylate, polyheptadecafluorodecyl (meth)acrylate, a copolymer of fluorine-containing (meth)acrylates, and a copolymer of fluorine-containing (meth)acrylate and other (meth)acrylate such as methyl (meth)acrylate, hydroxyethyl (meth)acrylate or glycidyl (meth)acrylate. These may be used in combination.

In the present invention, the above silicon compound and/or the above organic fluorine compound may be used with a solvent, an adhesion promoter, a curing agent and a curing catalyst as required.

The solvent is required to be that which can dissolve the above silicon compound and/or the above organic fluorine compound and can be uniformly applied to a substrate. The solvent is generally selected from fluorine-containing solvents, aliphatic or aromatic solvents, ketones and esters.

The adhesion promoter for improving the adhesion of the porous silica surface to the above silicon compound and/or the above organic fluorine compound is not always required. The adhesion promoter can therefore be selected depending upon use. Typical examples of the adhesion promoter include silane coupling agents such as γ-glycidoxypropyltrimethoxysilane, 2-(3,4-epoxycyclohexyl)ethyltrimethoxysilane, tetramethoxysilane and γ-aminopropyltrimethoxysilane.

When an organic silicon compound or organic fluorine compound having a hydroxyl group in the molecule is used, a curing agent such as polyisocyanate may be added to improve the moisture resistance and water resistance of the film. The curing agent is not always required, and may be selected depending upon use.

The curing agent is not always required, either, but is properly used to increase the film stability by promoting the curing of an organic silicon compound and/or organic fluorine compound having a functional group. Further, as a catalyst for promoting the hydrolysis and condensation of the alkoxy group, mainly used are acid catalysts such as hydrochloric acid, sulfuric acid, nitric acid and glacial acetic acid, alkali catalysts such as sodium hydroxide, potassium hydroxide and ammonia, ammonium perchlorate, magnesium perchlorate, and aluminum acetylacetonate. As a catalyst for a reaction between the isocyanate and hydroxyl, generally used are tin-containing catalysts such as dibutyltin dilaurate and amine-containing catalysts. For bonding the mercapto and vinyl, generally used is a platinum catalyst. For the heat polymerization of the (meth)acryloxy, a large number of catalysts including azo- and peroxide-containing catalysts are commercially available, and for the polymerization thereof by ultraviolet light or electron beam, a large number of catalysts including acetophenone- and benzophenone-containing catalysts are commercially available. For the polymerization of the vinyl, there is used a known method using an anionic or cationic catalyst.

The water-repellent layer of at least one of the above organic silicon compound and organic fluorine compound is formed by a number of methods such as a method in which a solution containing the organic silicon compound and/or the organic fluorine compound is applied to a glass substrate whose surface is modified into a porous layer, a method in which the above organic silicon compound and/or the organic fluorine compound are/is dry-coated on the above substrate by vapor deposition or plasma-polymerization, and a method in which the above organic silicon compound and/or the organic fluorine compound are/is vaporized and adsorbed on the above substrate. In view of cost, it is preferred to use the method in which a solution containing the organic silicon compound and/or the organic fluorine compound is applied to the substrate.

The method for applying a solution containing the organic silicon compound and/or the organic fluorine compound may be an immersing method, a spraying method, a roller coating method, a flow coating method or a rubbing method. The substrate to which the organic silicon compound and/or the organic fluorine compound have/has been applied in the above-specified manner is air-dried or heat-treated at a temperature between 50° C. and 200° C. for 1 to 120 min., whereby a water-repellent layer is formed on the porous silica layer. The application method, the drying method and the heat treatment time may be selected depending upon requirements of the intended product. The thickness of the water-repellent layer is preferably ten (monomolecular layer) to 5,000 angstroms. When this thickness exceeds 5,000 angstroms, the water-repellent layer shows a decrease in abrasion resistance, and the product has a poor appearance after tested for abrasion resistance. Further, for obtaining a glass product imparted with an anti-reflection function, the above thickness is required to be not more than 5,000 angstroms.

According to the present invention, a modified porous silica layer is formed on a glass substrate surface by treating the glass substrate surface with a silica-supersaturated aqueous solution of hydrosilicofluoric acid, and the porous silica layer exhibits excellent properties as adhesiveness to the organic silicon compound and/or the organic fluorine compound.

Therefore, the resultant glass is water-repellent glass excellent in durability performances such as water resistance, moisture resistance, weatherability and abrasion resistance. Although it is not clear why the porous silica layer improves the adhesion to the water-repellent agent, it is assumed that the porous silica layer formed by eluting alkali components, etc., has increased activity, and the water-repellent agent is effectively captured in pores of the porous silica layer.

EXAMPLES

The present invention will be described further in detail by reference to Examples. However, the present invention shall not be limited to these Examples.

EVALUATION AND TESTING METHODS

1) Contact Angle

A sample was measured for a contact angle of water by a sessile drop method with a CA-D supplied by Kyowa Kaimen Kagaku K. K. The measurement was conducted five times per sample, and the average value was taken as the value for the contact angle of water on the sample.

2) Resistance to Hot Water

A sample was immersed in boiling water for 4 hours, and then measured for a contact angle.

3) Abrasion Resistance

The abrasion resistance was evaluated on the basis of a turbidity difference as follows: A water-repellent glass surface was abraded by means of a Taber abrader under the conditions where the abrading wheel was a CS-10F wheel, the load was 500 g and the number of rotations was 1,000. The glass surface was measured for turbidity before and after the abrasion test with Model NHD-20D supplied by Nippon Denshoku Kogyo K. K. Further, the abraded surface was also measured for contact angle to study the influence of the abrasion on water repellency.

4) Fastness

A #300 flannel cloth was rubbed against a sample surface back and forth 3,000 times under a load of 1,200 g/4 $cm^2$ at a rate of 7,200 mm/min. Then, the rubbed surface was measured for a contact angle. Further, the rubbed portion and the non-rubbed portion were visually examined to study difference in interference color.

5) Weatherability

The weatherability was evaluated as follows. A sample was subjected to a so-called sunshine weatherometer test for 1,500 hours, in which the sample was showered with water for 12 minutes at 63°±3° C. per 1 hour.

Then, the sample was measured for contact angle, and the contamination by water marks was visually examined. Further, the sample was measured for turbidity before and after the test.

PREPARATION OF POROUS SILICA LAYER

A float plate glass (soda lime silicate glass, silica content=about 72% by weight) having a size of 20 cm×20 cm and a thickness of 3 mm was immersed in a 1% hydrofluoric acid (HF) aqueous solution for 30 minutes to clean both the surfaces thereof, and then washed with water. In this case, the thickness of the glass etched away was 6 μm. Then, the above float plate glass was immersed in a silica-supersaturated aqueous solution for 120 minutes, the silica-supersaturated aqueous solution having been prepared by dissolving silica powder in a hydrosilicofluoric acid aqueous solution having its concentration of 2.0 mol/l at 35° C. up to saturation, i.e., up to an amount of 20 g/l, and further adding $4 \times 10^{-3}$ mol of boric acid. The resultant porous layer had a thickness of 1,000 to 1,500 angstroms, and many pores had a diameter of about 50 to 400 angstroms. This glass is referred to as a substrate A hereinafter, This substrate A exhibited an interference color in bluish violet. The same float plate glass as above was immersed in the same silica-supersaturated aqueous solution as above for 80 minutes to form a porous silica layer on each surface. The resultant porous silica layer had a pore diameter equivalent to the diameter of the above porous silica layer, i.e., 50 to 400 angstroms, while it had a small thickness, as small as 200 to 400 angstroms. This glass is referred to as a substrate B hereinafter. This substrate B exhibited an interference color in light brown.

EXAMPLE 1

BEMCOT paper(supplied by Asahi Chemical K. K.) impregnated with a small amount of a .polydimethylsiloxane-containing water-repellent agent, Super Rain (supplied by Unelko), was wiped across the porous silica layer surfaces of the above-prepared substrate A. After a few minutes, the water-repellent agent remaining on the surfaces was wiped off with clean paper. Then, paper impregnated with the same water-repellent agent as above was wiped across the water-repellent agent-adhering surface of the substrate A, and after 10 minutes, the water-repellent agent remaining on the surfaces was wiped off with clean paper to give a water-repellent glass product. The resultant layer of the water-repellent agent was considered to have a thickness of about 100 angstroms. This water-repellent glass product was measured for light transmittance (wavelength 550 nm) with a spectrophotometer (model 330, supplied by Hitachi, Ltd.) and showed about 94%. An untreated float plate glass having the same dimensions was also measured for light transmittance and showed about 90%. Therefore, the reflectance of the above water-repellent glass product was about 4%, and the reflectance of the untreated float plate glass was about 8%. It was therefore found that the above water-repellent glass product had reflect ion-preventing capability.

EXAMPLE 2

Example 1 was repeated except that the water-repellent agent was replaced with a polydimethylsiloxane water-repellent agent (New Glass Coat, supplied by Toyota Motor Corp.) to give a water-repellent glass product. The resultant layer of the water-repellent agent was considered to have a thickness of about 100 angstroms.

EXAMPLE 3

The same substrate as the above-prepared substrate A was immersed in a silazane-containing water-repellent agent (KP801, supplied by Shin-Etsu Chemical Co., Ltd.), and pulled up at a rate of about 350 mm/min. to coat the water-repellent agent thereon. The substrate was air-dried for 10 minutes, and then baked at 150° C. for 30 minutes to form a layer of the water-repellent agent.

The resultant layer of the water-repellent agent was considered to have a thickness of about 100 angstroms.

EXAMPLE 4

The above-prepared substrate B was immersed in a silazane-containing water-repellent agent (KP801, supplied by Shin-Etsu Chemical Co., Ltd.), and pulled up at a rate of about 350 mm/min. to coat the water-repellent agent thereon. The substrate was air-dried for 10 minutes, and then baked at 150° C. for 30 minutes to form a layer of the water-repellent agent. The resultant layer of the water-repellent agent was considered to have a thickness of about 100 angstroms.

COMPARATIVE EXAMPLE 1

Example 1 was repeated except that the substrate A was replaced with a float soda lime plate glass, to give a water-repellent glass product.

COMPARATIVE EXAMPLE 2

Comparative Example 1 was repeated except that the water-repellent agent was replaced with a water-repellent agent, New Glass Coat, supplied by Toyota Motor Corp, to give a water-repellent glass product.

COMPARATIVE EXAMPLE 3

Example 3 was repeated except that the substrate A was replaced with a float soda lime plate glass, to give a water-repellent glass product.

COMPARATIVE EXAMPLE 4

Tetramethoxysilane (14.7 ml) was added to a mixture containing 135 ml of ethanol, 135 ml of isopropyl alcohol and 18 ml of a 0.1N hydrochloric acid aqueous solution, and the resultant mixture was stirred overnight at room temperature to obtain a treating solution.

Thereafter, a soda lime glass was immersed in the above treating solution for 10 seconds, and then pulled up at a rate of 200 mm/min. to form a partial hydrolysis condensate film of tetramethoxysilane on each surface of the glass. The glass was air-dried for 5 minutes, treated at 120° C. for 2 hours, and baked at about 400° C. for 2 hours to form a silicon oxide film on each surface of the glass. Then, the glass was treated in the same manner as in Example 3 to give a water-repellent glass product.

The above-obtained water-repellent glass products were evaluated on durability performances, and Table shows the results. When the water-repellent glass products obtained in Examples 1 to 4 and Comparative Examples 1 and 2 were visually evaluated on weatherability (turbidity difference), no or almost no water marks were observed. However, when the water-repellent glass products obtained in Comparative Examples 3 and 4 were visually evaluated for weatherability (turbidity difference), residual water marks were clearly observed.

TABLE

| | Contact angle (°) | | | Turbidity difference | | Difference in appearance between abraded portion and non-abraded portion | |
|---|---|---|---|---|---|---|---|
| | Initial stage | Hot water resistance | Abrasion resistance | Fastness | Weatherability | Abrasion resistance | Weatherability | Fastness |
| Ex. 1 | 105 | 103 | 79 | 89 | 92 | 0.5 | 0.3 | interference difference |
| Ex. 2 | 110 | 110 | 57 | 102 | 85 | 0.6 | 0.3 | interference difference |
| Ex. 3 | 111 | 117 | 107 | 108 | 115 | 0.9 | 0.0 | interference difference |
| Ex. 4 | 110 | 112 | 108 | 105 | 110 | 0.7 | 0.0 | slight difference |
| CEx. 1 | 100 | 67 | 62 | 90 | 71 | 0.9 | 0.9 | no difference |
| CEx. 2 | 102 | 66 | 51 | 90 | 63 | 0.9 | 1.0 | no difference |
| CEx. 3 | 105 | 52 | 90 | 98 | 99 | 1.0 | 3.1 | no difference |
| CEx. 4 | 107 | 98 | 86 | 97 | 104 | 0.9 | 2.3 | no difference |

Ex = Example,
CEx = Comparative Example

What is claimed is:

1. A water-repellent glass product formed of (a) a silicate glass substrate containing a component other than silicon oxide., (b) a 100Å–3000Å thick, porous silicon oxide layer formed by removal of said component other than silicon oxide from a surface of the silicate glass substrate, and (c) a water-repellent layer having a thickness of no greater than 5000Å and formed of at least one of an organic silicon compound and an organic fluorine compound on a surface of the porous silicon oxide layer.

2. A water-repellent glass product according to claim 1, wherein porous glass layer has pores measuring 50–400 angstroms in diameter.

3. A water-repellent glass product according to claim 1, wherein the organic silicon compound forming the water-repellent layer includes polysiloxane, a cholorosilane, an alkoxysilane or a silazane as a major component.

4. A water-repellent glass product according to claim 3, wherein the chlorosilane compound and alkoxysilane compound have the following formula $R^1_m SiR^2_n$ wherein W is a substituent selected from the group consisting of alkyl groups having 1 to 20 carbon atoms, fluoroalkyl groups, groups containing alkyl in combination with —O—, $CO_2$—, $SO_2N(C_3H_7)$ or CONH— and groups containing fluoroalkyl in combination with —O—, $CO_2$—, $SO_2N(C_3H_7)$ or CONH—, $R^2$ is chlorine or an alkoxyl group having 1 to 6 carbon atoms, m is 1, 2 or 3, and n is 1, 2 or 3, provided that m+n=4.

5. A water-repellent glass product according to claim 1, wherein the organic fluorine compound includes a linear, branched or cyclic polydimethylsiloxane group.

6. A water-repellent glass product according to claim 1, wherein the thickness of water-repellent layer is 200–1500 angstroms.

7. A water-repellent glass product in accordance with claim 1 wherein said silicate glass substrate contains an alkali metal or an alkaline earth metal and wherein said alkali metal or alkaline earth metal has been removed from said surface layer of said silicate glass substrate to form said porous modified layer.

* * * * *

UNITED STATES PATENT AND TRADEMARK OFFICE
CERTIFICATE OF CORRECTION

PATENT NO. : 5,415,927
DATED : May 16, 1995
INVENTOR(S) : HIRAYAMA et al

Page 1 of 2

It is certified that error appears in the above-indentified patent and that said Letters Patent is hereby corrected as shown below:

Col. 2, line 66, after "transparency" insert a period --.--.

Col. 3, line 23, after "formed" insert a period --.--.

Col. 5, line 9, after "$CF_3(CF_2)_7CH_2CH_2SiCl_3$," insert
--$CF_3(CF_2)_7CH_2CH_2Si(CH_3)(OCH_3)_2$, $CF_3(CF_2)_7CH_2CH_2Si(CH_3)Cl_2$,--;

line 13, "$C_7F_{15}CONHCH_2CH_2CH_2SiOCH_3)_3$" should read
--"$C_7F_{15}CONHCH_2CH_2CH_2Si(CH_3)_3$--;

line 14, "$C_{88}$" should read --$C_8$--;

line 26, "compound" should read --compounds--;

line 39, "olgom-" should read --oligom- --.

Col. 8, line 61, "refect ion" should read --reflection--.

UNITED STATES PATENT AND TRADEMARK OFFICE
CERTIFICATE OF CORRECTION

PATENT NO. : 5,415,927
DATED : May 16, 1995
INVENTOR(S) : HIRAYAMA et al

It is certified that error appears in the above-indentified patent and that said Letters Patent is hereby corrected as shown below:

Col. 10, line 11, delete "Table" and insert --the Table which follows--; and line 47, delete "oxide.," and insert --oxide,--.

Col. 11, line 1, delete "W" and insert --$R^1$--.

Signed and Sealed this

Fifth Day of December, 1995

BRUCE LEHMAN

*Attest:*

*Attesting Officer*     *Commissioner of Patents and Trademarks*